Nov. 15, 1949 — E. J. OTTO — 2,487,980

BELT TRANSMISSION

Filed March 20, 1944

Inventor
E. J. Otto
by William S. Gates
Attorney

Patented Nov. 15, 1949

2,487,980

UNITED STATES PATENT OFFICE 2,487,980

BELT TRANSMISSION

Eugene J. Otto, Milwaukee, Wis., assignor to Allis-Chalmers Manufacturing Company, Milwaukee, Wis., a corporation of Delaware Application March 20, 1944, Serial No. 527,253

4 Claims. (Cl. 74—230.17)

This invention relates to variable speed V-belt drives of the type in which two pulleys having relatively movable conical belt-edge-engaging flanges are joined by an edge driving power transmission belt.

Many types of variable pitch V-belt pulleys are well known to the art. It is well known to oppositely move both flanges of both pulleys to cause a speed change without change in belt alinement. It is also known in framed, or floor mounted, speed changer units to move opposite flanges of the respective pulleys keeping one flange of each axially fixed to cause speed ratio changes without causing belt misalinement as in United States Patent No. 2,221,166 issued to C. W. Heinrich et al., November 12, 1940, in which inventor herein is a joint inventor.

However, prior to applicant's invention of a pulley for mounting on a shaft end, in which the inner flange of the sheave relative to the shaft end is movable and the outer flange axially fixed, and which has mechanism mounted thereon outward of the shaft end for positive control of pitch-diameter while the sheave is in motion, it was not known to have a drive of two variable pitch diameter sheaves on parallel shafts in which the outer flange of one was movable and the inner flange of the other was movable, the sheaves being connected by motion control mechanism mounted thereon and capable of controlling the pitch-diameters to obtain a variable speed ratio without belt misalinement.

It is an object of the present invention to provide a variable pitch-diameter sheave for mounting on a shaft end, the sheave to carry a positively acting pitch-diameter changing mechanism for adjusting the axial position of a movable inner conical flange in relation to an axially fixed outer conical flange while the sheave is in motion.

It is a further object of the invention to so construct such a pulley that the pitch-diameter changing mechanism will be protected against ready exit of lubricant and entry of dust and dirt.

A still further object consists in providing a speed changer comprising a pair of variable pitch-diameter belt-edge engaging sheaves for mounting on a driving and a driven shaft, said sheaves having oppositely arranged fixed and movable flanges and carrying pitch-diameter changing mechanisms on corresponding ends thereof, joined by a common control member for simultaneously adjusting the pitch-diameters of said sheaves in opposite directions without changing the belt alinement, while said sheaves are in motion.

The above and still further objects which may appear from the following description, may best be carried into practical effect as fully described below with reference to the accompanying drawing in which.

Figures 1, 2, 3:
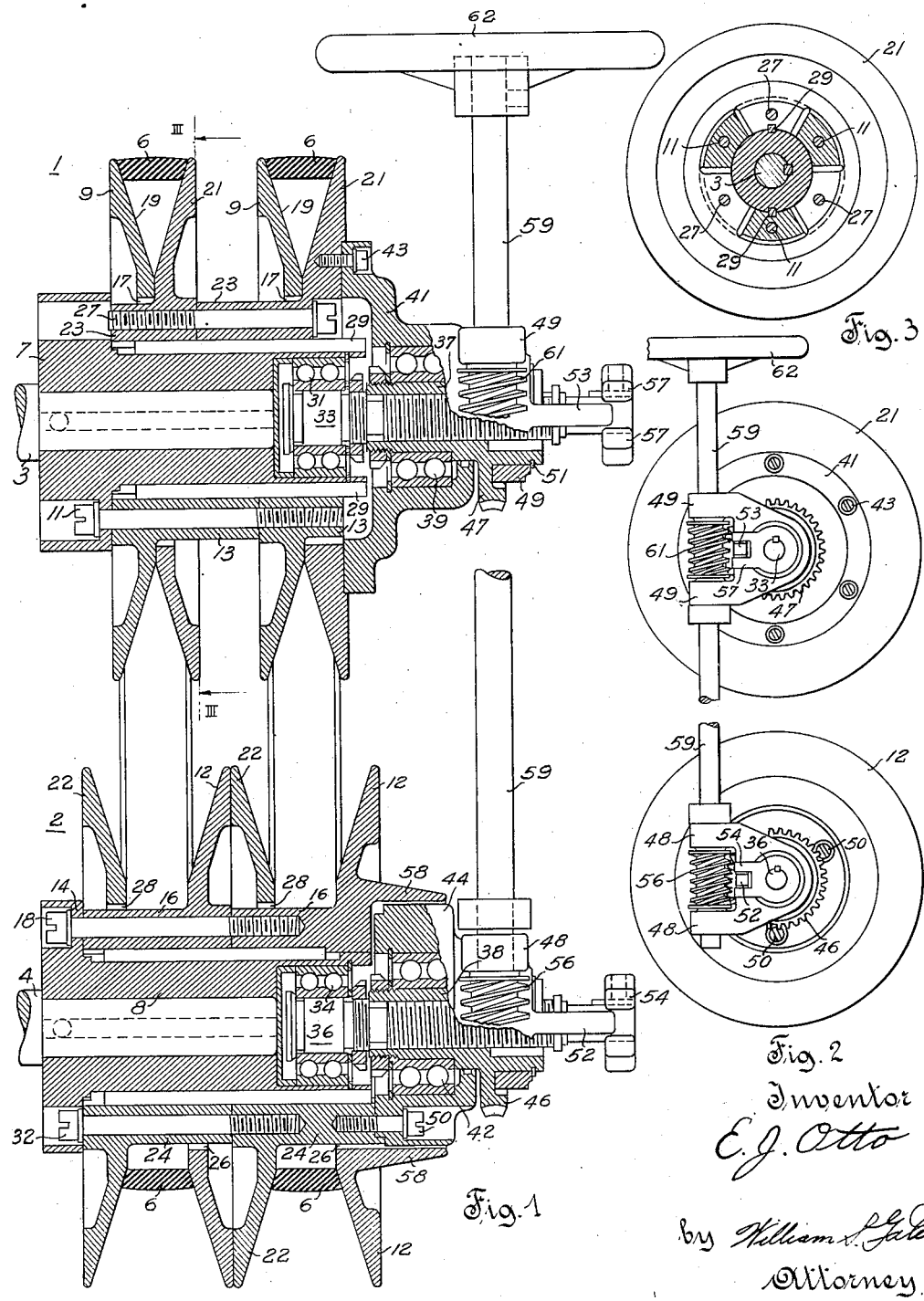
Fig. 1 is a view, shown partly in section on a plane through the parallel axes, of a variable speed-ratio V-belt drive according to the invention.
Fig. 2 is an end elevation to a reduced scale of the drive shown in Fig. 1.
Fig. 3 is a detail cross-section taken on the line III—III of Fig. 1 to a reduced scale.

In variable speed ratio drives of the type in which a variable pitch-diameter sheave, of the type having two relatively movable frusto-conically faced flanges, engages the sides of a V-belt, or edge-driving belt with wedge-shaped cross-section, which in turn engages a second similar sheave on a parallel shaft, the pitch-diameter of which is simultaneously changed in opposite sense, it is important, for efficient and effective transmission of power, that the belt be kept in perfect alinement with the grooves in which it operates. That is, the medial planes of corresponding pairs of flanges on the two sheaves should coincide in order that the belt may not enter the groove at an angle to the medial plane. The grooves of oppositely variable sheaves may be kept alined by following either of two different principles: (1) both flanges of each sheave may move oppositely relative to a fixed medial plane, in which case the belt will tend to remain constantly in one plane; and (2) alternate flanges may be axially fixed relative to their respective shafts and the remaining flanges of both sheaves may be moved simultaneously and equally in the same direction causing a translatory movement of the belt, which will nevertheless be kept in perfect alinement with the pairs of flanges, its plane always coinciding with the medial plane of the pairs of flanges which also is translatorily moved to the same extent, namely, half the relative movement of the flanges. The first principle has been utilized in many speed changers, but has the disadvantage that more complex mechanism is required than for the second. The second principle has also been utilized, as in the patent to Heinrich et al. 2,221,166 of which the inventor herein is a joint inventor, and in the patent to C. E. Ives 1,983,132; but, the arrangement of neither of these prior art patents achieved the advantages of structure and arrangement found in the invention described hereinbelow. This invention for the first time provides a motion controlled variable speed-ratio drive which is readily adaptable to be mounted on, and to transmit power between a pair of parallel shaft ends extending in the same direction.

The drawing shows a drive according to the present invention in which sheaves 1 and 2 are mounted on stub shafts 3 and 4, respectively, extending in the same direction in parallel spaced relation. The sheaves 1 and 2 are joined in driving relation by a driving belt or belts 6 in a manner similar to that described in said Heinrich et al. Patent 2,221,166, mentioned above.

Sheave 1 may have a hub 7 formed as a sleeve secured in a suitable manner to shaft 1. Assembled on hub 7 may be one or more stationary flanges 9 secured in position as by screws 11 and in the case of more than one flange 9 held rigidly spaced as a unit by arcuate lugs 13 which may be made integral with the flanges. Circumferentially between lugs 13, apertures 17 extend axially through said flanges 9 radially inward of frusto-conical belt edge engaging surfaces 19 for a purpose to appear hereinbelow.

Also assembled on hub 7 are one or more movable flanges 21 having arcuate lugs 23, extending between successive movable flanges 21 in case there are more than one to act as separators, passing through apertures 17 in stationary flanges 9. In case of a plurality of moving flanges 21 they are bound together for movement as a unit as by screws 27.

The movable flanges 21 and stationary flanges 9 may all be keyed to hub 7 as by keys 29 to prevent relative rotation in a well known manner.

Fixed in an end of hub 7, a combined journal and thrust bearing 31, which may be of the ball type, carries in coaxially fixed relation a threaded spindle 33 secured therein by any suitable means as shown in Fig. 1. In threaded engagement with the spindle 33 is a nut 37. A second combined journal and thrust bearing 39 connects said nut 37 with a housing member 41, secured to a movable flange 21 as by screws 43. Fixed on nut 37 is a worm wheel 47, shown integral with nut 37. A control shaft bearing yoke 49 is mounted in rotatable axially fixed relation on nut 37, being secured in place in any suitable manner as by snap ring 51. Control shaft bearing yoke 49 may be provided with an eccentric axially-extending spline or lug 53 which may engage in slidable relation a forked collar 57, securely fixed on the spindle 33 in such a manner as to prevent relative rotation of said spindle 33 and yoke 49. This mechanism forms a pitch-diameter determining mechanism.

Fixed on a control shaft 59, a worm 61 is arranged to engage worm wheel 47 in such a manner that rotation of the shaft 59 will cause relative rotation of nut 37 and spindle 33 and will axially adjust the position of movable flange or flanges 21 while the sheave may be in operation. The worm 61 may be axially slidable with relation to shaft 59, if desirable, in order to provide for adjustment of the spacing of shafts 3 and 4.

Sheave 2 may have a hub 8 formed similarly to hub 7 and secured in a similar suitable manner to shaft 4. On hub 8 may be mounted one or more relatively stationary flanges 12 spaced from a shoulder 14, and from each other, by arcuate lugs 16, which may be formed integrally with said flanges 12. The stationary flanges 12 may be secured on the hub 8 by screws 18, as shown in Fig. 1. It will be noted that in sheave 1 the stationary flanges 9 have their belt engaging faces 19 facing in one direction relative to hub 7, while in sheave 2 the stationary flanges 12 face in the opposite direction. As a result the first, or outer flange, with relation to the stub shaft 4 on which the sheave 2 is mounted will be stationary.

With respect to the arrangement of the sheaves in this description and in the claims hereto appended, the flanges may be considered as numbered in series, the first flange being, in a stub shaft mounted sheave, the outer flange, or the one nearest an observer looking toward the end of the shaft, that is, from the right in Fig. 1, the second flange being the next nearest, which cooperates with the first to engage a belt. Thus the first flange of sheave 1 is a movable flange 21 and the second a fixed flange 9, while the first flange of sheave 2 is a fixed flange 12.

Slidably mounted on hub 8 of sheave 2 is at least one movable flange 22 having arcuate lugs 24 arranged to pass slidably through apertures 26 in a cooperating fixed flange 12. Flanges 22 are provided with apertures 28 to accommodate lugs 16 of a flange 12. Two or more flanges 22 may be bound together as a unit, as shown in Fig. 1, by any suitable means such as screw 32. Mounted in the sleeve 8 is a pitch-diameter determining mechanism in which parts 34, 36, 38, 42, 46, 48, 52, 54 and 56 are the equivalents in all respects of elements 31, 33, 37, 39, 47, 49, 53, 57 and 61, respectively, forming a mechanism for sheave 2 identical with that described above in connection with sheave 1. Annulus or thrust member 44 is secured to bearing 42 in the same manner as housing member 41 in sheave 1 but differs from member 41 in that it connects not to the first flange 12 of sheave 2, but to the lugs 24 of the second flange, which is a movable flange 22. Said lugs 24 extend through the apertures 26 of the first flange 12, and are secured to thrust member 44 by suitable means, for example, screws 50. The first or outer flange 12 differs from the succeeding stationary flanges, if any, in that it is provided with a sleeve-like axial extension 58, which is arranged to surround the peripheral surface of thrust member 44, allowing only sufficient radial clearance for free relative axial movement between said parts 58 and 44 throughout the full range of adjustment of said part 44. It will be seen that tubular extension 58 cooperates with annular thrust member 44 to house in the space between said member 44 and the first flange 12, of which said extension 58 is a part, forming a telescoping shield against the entry of dirt and dust and the escape of oil from the space surrounding the spindle 36, which space would otherwise be radially open to atmosphere through the spaces between lugs 24 whenever the sheave 2 was adjusted to any but its smallest pitch-diameter.

On control shaft 59 there may be placed a hand wheel 62, or other well known means (not shown), which would enable shaft 59 to be rotated in either direction manually, or by any known system of remote control (not shown).

The control shaft 59 will prevent relative rotation of control shaft bearing yokes 48 and 49 which in turn, through lugs 52 and 53 and collars 54 and 57, will prevent rotation of spindles 33 and 36. Rotation of control shaft 59 will turn worms 56 and 61 causing equal simultaneous rotation and axial translation of nuts 38 and 37. Translation of nuts 38 and 37 will, through thrust bearings 42 and 39, cause equal and simultaneous axial movement of thrust member 44 and housing member 41 and movable flanges 22 and 21.

Since each movable flange 21 of sheave 1 is to the right of its cooperating stationary flange 9, as shown in Fig. 1, and each movable flange 22 of sheave 2 is to the left of its cooperating stationary flange 12, equal simultaneous axial movement of flanges 21 and 22 will cause equal and opposite changes in pitch-diameter of sheaves 1 and 2 with respect to a given edge-driving belt 6, and the medial planes between flanges 9 and 21 and 12 and 22, respectively, will coincide in all positions of flanges 21 and 22 when the sheaves 1 and 2 are properly alined on their respective shafts. Thus, the belts 6 will run in perfect alinement through all adjusted positions of the said movable flanges 21 and 22 and the belt tension will be maintained throughout the range of speed-ratios.

While a particular embodiment of the invention has been shown in the drawing and described in the specification, it will be understood that the invention is intended to include such modifications and equivalents as may readily occur to persons skilled in the art, and is limited only by the scope of the appended claims.

It is claimed and desired to secure by Letters Patent:

1. A variable speed-ratio drive between parallel shafts, comprising a pair of variable pitch-diameter sheaves mounted on said shafts, operatively alined pairs of relatively movable frusto-conical belt-edge-engaging flanges on said sheaves cooperating to form belt-engaging grooves, a belt connecting said grooves in driving relation, each of said sheaves comprising a hub sleeve adapted for mounting on a shaft in driving relation, pitch-diameter changing mechanism carried by said sleeve in rotatable axially fixed relation and having a portion axially movable relative to said sleeve, said axially movable portions extending in the same direction relative to said hub sleeves, one of said flanges of each said alined pair being mounted in fixed relation on its corresponding hub sleeve and the other of said flanges being mounted in axially slidable relation to said fixed flange, relatively fixed flanges of said alined pairs facing in opposite directions, means on each said sheave to operatively connect the axially slidable flange of said alined pair to said movable portion of said pitch-diameter changing mechanism for axial movement therewith and control means to simultaneously control said pitch-diameter changing mechanisms during rotation of said sheaves to vary the pitch-diameters of said sheaves in opposite directions while maintaining said belt substantially in alinement with said grooves, said pitch-diameter changing mechanisms of said sheaves being at the same ends thereof, and said control means being carried by and operatively connected to both of said pitch-diameter changing mechanisms on the same side of the plane of said belt.

2. In a variable pitch-diameter sheave, a hub adapted for mounting on a shaft in driving relation, a first belt-engaging flange mounted on said hub in fixed relation, said flange having a plurality of axially extending apertures therethrough, a second belt-engaging flange cooperating with said first flange to engage the edges of a belt therebetween, said second flange being slidably mounted on said hub, pitch-diameter determining means carried by said hub in axially adjustable relation, said pitch-diameter determining means being attached to said second flange in axially fixed relation by a plurality of lugs corresponding to said apertures and extending therethrough, and housing means on the rearward side of said first flange radially outward of said apertures cooperable with said pitch-diameter determining means to substantially enclose the space between said pitch-diameter determining means and said first flange in all adjusted positions.

3. In a variable speed-ratio drive in which a pair of oppositely variable pitch-diameter sheaves are mounted on spaced parallel shafts, control mechanism comprising a threaded member mounted on each of said sheaves in axially fixed relatively rotatable relation, a nut threadedly engaging each said threaded member, a worm wheel coaxially fixed on each said nut, control shaft bearings mounted on said nuts in relatively rotatable axially fixed relation, worms mounted on a control shaft carried by said control shaft bearing, said worms engaging said worm wheels, and means preventing rotation of said threaded members relative to said control shaft bearings.

4. In a variable speed-ratio drive having a pair of alined variable pitch-diameter sheaves mounted on parallel shafts and drivingly connected by one or more edge-driving belts, the combination comprising a pair of hub sleeves one or more frusto-conical faced axially fixed flanges on each said hub sleeve, said fixed flanges of one said hub sleeve facing in one direction and said fixed flanges of the other said hub sleeve facing in the other direction, one or more axially movable flanges on each said hub sleeve, each said movable flange facing a corresponding fixed flange to form therewith a variable pitch-diameter belt-edge-engaging groove, pitch-diameter determining means carried by said hub sleeves on the same end thereof, and common control means carried by said hub sleeves and operatively connected with said pitch-diameter determining means on the same side of the plane of said belts for simultaneously moving all of said movable flanges in the same direction, whereby said belts will be maintained in correct alinement and driving engagement with said grooves throughout the entire range of speed-ratios of said drive.

EUGENE J. OTTO.

REFERENCES CITED

The following references are of record in the file of this patent:

UNITED STATES PATENTS

| Number | Name | Date |
|---|---|---|
| 1,983,132 | Ives | Dec. 4, 1934 |
| 2,127,031 | Johnson | Aug. 16, 1938 |
| 2,262,197 | Otto et al. | Nov. 11, 1941 |
| 2,342,941 | Johnson | Feb. 29, 1944 |